United States Patent [19]

Drake et al.

[11] Patent Number: 6,077,984

[45] Date of Patent: *Jun. 20, 2000

[54] PROCESS FOR MAKING ZEOLITE CONTAINING ZINC BORATE COMPOSITION, THE COMPOSITION AND THE USE THEREOF IN HYDROCARBON CONVERSION

[75] Inventors: Charles A. Drake, Nowata; An-hsiang Wu, Bartlesville; Jianhua Yao, Bartlesville; Scott D. Love, Bartlesville, all of Okla.

[73] Assignee: Phillips Petroleum Company, Bartlesville, Okla.

[ * ] Notice: This patent is subject to a terminal disclaimer.

[21] Appl. No.: 09/144,940

[22] Filed: Sep. 1, 1998

[51] Int. Cl.⁷ .............................. C07C 2/52; C07C 4/12; C10G 35/06

[52] U.S. Cl. .......................... 585/418; 585/486; 585/489; 208/135

[58] Field of Search .................................... 585/405, 444, 585/418, 467, 475, 481, 486–489; 208/114, 120.25, 135

[56] References Cited

U.S. PATENT DOCUMENTS

| | | | |
|---|---|---|---|
| 3,549,316 | 12/1970 | Nies et al. | 23/59 |
| 3,649,172 | 3/1972 | Nies et al. | 23/59 |
| 3,922,217 | 11/1975 | Cohen et al. | 208/299 |
| 4,049,573 | 9/1977 | Kaeding | 252/432 |
| 4,206,042 | 6/1980 | Antos | 208/139 |
| 4,238,320 | 12/1980 | Cronauer et al. | 208/254 H |
| 4,313,821 | 2/1982 | Garwood et al. | 208/245 |
| 4,429,174 | 1/1984 | Teng et al. | 585/426 |
| 4,665,253 | 5/1987 | Chu et al. | 585/467 |
| 4,720,602 | 1/1988 | Chu | 585/407 |
| 4,751,339 | 6/1988 | Beech, Jr. et al. | 585/415 |
| 4,855,521 | 8/1989 | Avidan et al. | 585/415 |
| 4,910,357 | 3/1990 | Dessau et al. | 585/322 |
| 4,912,073 | 3/1990 | Chu | 502/85 |
| 4,973,790 | 11/1990 | Beech, Jr. et al. | 585/533 |
| 5,053,374 | 10/1991 | Absil et al. | 502/64 |
| 5,053,579 | 10/1991 | Beech, Jr. et al. | 585/533 |
| 5,095,161 | 3/1992 | Abrevaya et al. | 585/500 |
| 5,182,242 | 1/1993 | Marler | 502/66 |
| 5,334,308 | 8/1994 | Graiff et al. | 208/299 |
| 5,643,441 | 7/1997 | Timken et al. | 208/89 |
| 5,898,089 | 4/1999 | Drake et al. | 585/418 |

OTHER PUBLICATIONS

Supplement to Mellor's Comprehensive Treatise on Inorganic and Theoretical Chemistry, vol. 5; Boron, Part A: Boron–Oxygen Compounds, "Zinc Borates", pp. 572–578 (1980).

Kirk–Othmer: Encyclopedia of Chemical Technology, 3rd ed., vol. 4, "Zinc Borates", pp. 106–108.

Cotton, F.A. and Wilkinson, G., "Advanced Inorganic Chemistry", 5th ed., pp. 167–171 (1988).

*Primary Examiner*—Walter D. Griffin
*Assistant Examiner*—Thuan D. Dang
*Attorney, Agent, or Firm*—Reece A. Scott

[57] ABSTRACT

A novel zeolite catalyst composition comprising a mixture of a zeolite, a binder, and a zinc borate compound wherein such mixture is calcined or treated with steam. Preferably, the zeolite has not been treated with an acid. Also provided is a process of making such composition, a product by such process, and the use thereof in the conversion of a hydrocarbon-containing fluid such as a gasoline-boiling range fluid or coker naphtha. Use of such zeolite in the conversion of a hydrocarbon-containing fluid also includes pre-treating such hydrocarbon-containing fluid with a nitrogen removal medium such as ion-exchange resin.

34 Claims, 1 Drawing Sheet

PROCESS FOR MAKING ZEOLITE CONTAINING ZINC BORATE COMPOSITION, THE COMPOSITION AND THE USE THEREOF IN HYDROCARBON CONVERSION

BACKGROUND OF THE INVENTION

The invention relates to a zeolite catalyst composition and an improved method of making a zeolite catalyst composition which has improved properties when compared with certain other zeolite catalysts. The improved method is especially important because it provides a zeolite catalyst composition with reduced coke formation properties and greatly simplifies the preparation of certain metal-promoted zeolite catalysts.

It is known to catalytically crack gasoline boiling range hydrocarbons (in particular, non-aromatic gasoline boiling range hydrocarbons, more in particular, paraffins and olefins) to light olefins, also referred to as lower olefins (such as ethylene and propylene), and aromatic hydrocarbons (such as BTX, i.e., benzene, toluene, and xylenes, and also ethylbenzene) in the presence of catalysts which contain a zeolite (such as ZSM-5), as is described in an article by N.Y. Chen et al. in Industrial & Engineering Chemistry Process Design and Development, Volume 25, 1986, pages 151–155. The reaction product of this catalytic cracking process contains a multitude of hydrocarbons such as unconverted $C_5+$ alkanes, lower alkanes (methane, ethane, propane), lower alkenes (ethylene and propylene), $C_6$–$C_8$ aromatic hydrocarbons (benzene, toluene, xylene, and ethylbenzene), and $C_9+$ aromatic hydrocarbons. Depending upon the relative market prices of the individual reaction products, it can be desirable to increase the yield of certain of the more valuable products relative to the others.

One concern with the use of zeolite catalysts in the conversion of hydrocarbons to aromatic hydrocarbons and light olefins is the excessive production of coke during the conversion reaction. The term "coke" refers to a semi-pure carbon generally deposited on the surface of a metal wall or a catalyst. Coke formed during the zeolite catalyzed aromatization of hydrocarbons tends to cause catalyst deactivation. It is desirable to improve processes for the aromatization of hydrocarbons, and the formation of light olefins from hydrocarbons, by minimizing the amount of coke formed during such processes. It is also desirable to have a zeolite catalyst that is useful in producing significant quantities of the aromatic and olefin conversion products.

Certain known methods of preparing zeolite catalysts often require the modification of a zeolite or zeolite material with an acid to remove components which hinder the reaction and/or promote coke formation. The elimination of the process step of acid-treating, or acid-leaching, the zeolite can be desirable provided that it does not negatively impact the catalytic performance of the modified zeolite. The elimination of the acid-treating step can be particularly desirable if it results in an improved catalyst. There are also economic and safety benefits from an elimination of a process step involving the use of a strong acid.

It is also known that a thermally-cracked hydrocarbon-containing fluid in the gasoline boiling range, especially coker naphtha, may be produced by a coking process such as delayed coking, fluid coking, or contact coking, all of which are known processes in the petroleum refining industry. Because the coking process(es) are well known to one skilled in the art, the description of such coking process(es) is omitted herein.

Coker naphtha, being produced by a coking process, has a low octane number, typically no higher than about 70, and is a volatile material which is highly olefinic and diolefinic. Coker naphtha also tends to form gums by polymerization of diolefins and other unsaturated species which are present in the coker naphtha. Although the content of unsaturated species is high, with bromine numbers (ASTM D1159) typically in the range of 50 to 80, there is no positive contribution to octane from the unsaturated species as they are low octane components. Before the coker naphtha can be used elsewhere in a refinery, the coker naphtha must be severely hydrotreated to remove the olefinic and diolefinic materials. Such treatment results in an even lower octane number. Thus, the coker naptha must be further processed (for example, by reforming) before it can be used as a fraction in the gasoline boiling range with a high octane number, i.e., before it can be used as a motor fuel.

It is therefore desirable to improve the processes for the upgrading of a catalytically-cracked or thermally-cracked hydrocarbon-containing fluid in the gasoline boiling range, such as catalytically-cracked gasoline or coker naphtha, to reduce the levels of, or preferably remove, the low value olefinic and diolefinic materials (such as $C_5+$ olefins and diolefins) from such hydrocarbon-containing fluid to produce a product containing high value petrochemicals such as aromatics (such as BTX, i.e., benzene, toluene, and xylene) and light olefins (such as ethylene, propylene, and butylene). It is also desirable to have a zeolite catalyst composition that is useful in the upgrading of such hydrocarbon-containing fluid, such as catalytically-cracked gasoline or coker naphtha, in a single-step process.

It is also known that these hydrocarbon-containing fluids are often contaminated with large amounts of nitrogen compounds. The presence of these nitrogen compounds can cause a loss of zeolite catalyst activity and stability. It is therefore desirable to have a process that does not significantly decrease the activity and stability of a zeolite catalyst when such catalyst is used in the conversion of hydrocarbons, preferably during the upgrading of hydrocarbon-containing fluids such as coker naphtha.

SUMMARY OF THE INVENTION

It is an object of this invention to at least partially convert hydrocarbons to aromatics (such as BTX, i.e., benzene, toluene, xylene and also ethylbenzene) and light olefins (such as ethylene and propylene) utilizing an improved zeolite catalyst composition, that has been prepared by various methods including treatment with or without acid, and further, such zeolite includes a boron component and a zinc component (preferably the boron component and the zinc component are in the form of a zinc borate compound, more preferably, zinc hexaborate, $Zn_2B_6O_{11}$).

Another object of this invention is to provide a process for making an improved zeolite catalyst composition that has such desirable properties as providing for lower coke production and an improved yield of aromatics (such as BTX) and light olefins (such as ethylene and propylene) when utilized in the conversion of hydrocarbons.

A further object of this invention is to provide an improved process for the conversion of hydrocarbons in which the rate of coke formation during such conversion of hydrocarbons is minimized.

A yet further object of this invention is to provide an improved zeolite material which, when used in the conversion of hydrocarbons, results in less coke formation than alternative zeolite materials.

Yet another object of this invention is to provide hydrocarbon conversion processes which have an acceptably low coke production rate and/or which produce a conversion product containing suitable quantities of aromatics (such as BTX) and light olefins (such as ethylene and propylene).

Yet another further object of this invention is to provide a method for making an improved zeolite material having such desirable properties as providing for low coke production and improved yields of light olefins, with an especially improved ratio of olefins to aromatics in the product, when used in the conversion of hydrocarbons.

Yet another further object of this invention is to provide a method for making an improved zeolite material having such desirable properties as providing for improved concentrations of benzene in the BTX fraction of a reaction product produced when such improved zeolite material is used in the conversion of hydrocarbons.

Yet another further object of this invention is to provide a method for making an improved zeolite material having such desirable properties as providing for the increasing of the yield of aromatics with only a slight decreasing of the yield of light olefins by using the improved zeolite material in the conversion of hydrocarbons.

Yet another further object of this invention is to provide a method for making an improved zeolite material having such desirable properties as providing for the increasing of the yield of light olefins with only a slight decreasing of the yield of aromatics by using the improved zeolite material in the conversion of hydrocarbons.

Yet another further object of this invention is to provide a method for making an improved zeolite material having such desirable properties as providing for the upgrading of a thermally-cracked hydrocarbon-containing fluid in the gasoline boiling range, such as coker naphtha, in a single-step process to reduce the levels of, or preferably remove, the low value olefinic and diolefinic materials (such as $C_5+$ olefins and diolefins) and other low value hydrocarbons from such thermally-cracked hydrocarbon-containing fluid to produce a high value product containing a high concentration of aromatics (such as BTX), high value light olefins (such as ethylene, propylene, and butylene), and paraffins (such as methane, ethane, and propane).

Yet another object of this invention is to provide hydrocarbon conversion processes which produce a conversion product containing suitable quantities of aromatics (such as BTX).

Yet another object of this invention is to provide hydrocarbon conversion processes for the upgrading of a thermally-cracked hydrocarbon-containing fluid in the gasoline boiling range, such as coker naphtha, in a process that does not significantly decrease the activity and stability of a zeolite catalyst which results in an aromatic (such as BTX) yield which does not decline rapidly over time during the upgrading of such thermally-cracked hydrocarbon-containing fluid.

One of the inventive methods provides for the conversion of hydrocarbons, preferably non-aromatic hydrocarbons, to aromatic hydrocarbons (such as BTX) and light olefins (such as ethylene and propylene) by contacting, under reaction conditions (i.e., conversion conditions), a hydrocarbon-containing fluid with an improved zeolite catalyst composition prepared by a method that includes utilizing a zeolite. The zeolite is combined, or incorporated, with a binder, a boron component and a zinc component (preferably the boron component and the zinc component are in the form of a zinc borate compound, and, more preferably, the boron component and the zinc component are in the form of zinc hexaborate, $Zn_2B_6O_{11}$), to form a mixture. The mixture is then calcined or treated with steam (depending on the desired reaction products), to form the improved zeolite catalyst composition. Thus, an embodiment of the invention is a novel composition comprising a mixture that has been calcined wherein the mixture comprises a zeolite (that has not been treated with an acid), a binder, a boron component, and a zinc component (preferably the boron component and the zinc component are in the form of a zinc borate compound, and, more preferably, the boron component and the zinc component are in the form of zinc hexaborate, $Zn_2B_6O_{11}$).

Another embodiment of the invention is a novel composition comprising a mixture that has been treated with steam, in lieu of calcination, wherein the mixture comprises a zeolite (that has not been treated with an acid), a binder, a boron component, and a zinc component (preferably the boron component and the zinc component are in the form of a zinc borate compound, and, more preferably, the boron component and the zinc component are in the form of zinc hexaborate, $Zn_2B_6O_{11}$). The zeolite catalyst composition prepared by the novel inventive method can be used to convert hydrocarbons, preferably non-aromatic hydrocarbons, to aromatics and light olefins, by contacting the catalyst under reaction conditions with a hydrocarbon-containing fluid.

The zeolite catalyst composition prepared by the inventive method can also be used for the upgrading of thermally-cracked hydrocarbon-containing fluid in the gasoline boiling range, such as coker naphtha, in a single-step process to reduce the levels of, or preferably remove, the olefinic and diolefinic materials (such as $C_5+$ olefins and diolefins) and other low value hydrocarbons from such thermally-cracked hydrocarbon-containing fluid to produce a product containing a high concentration of aromatics (such as BTX), high value light olefins (such as ethylene, propylene, and butylene), and paraffins (such as methane, ethane, and propane).

The zeolite catalyst composition prepared by the inventive method can also be used in a process that does not significantly decrease the activity and stability of such zeolite catalyst composition when such zeolite catalyst is used in the conversion of hydrocarbons, preferably during the upgrading of a thermally-cracked hydrocarbon-containing fluid such as coker naphtha.

Other objects and advantages of the invention will become apparent from the detailed description and the appended claims.

DETAILED DESCRIPTION OF THE INVENTION

Figure 1:
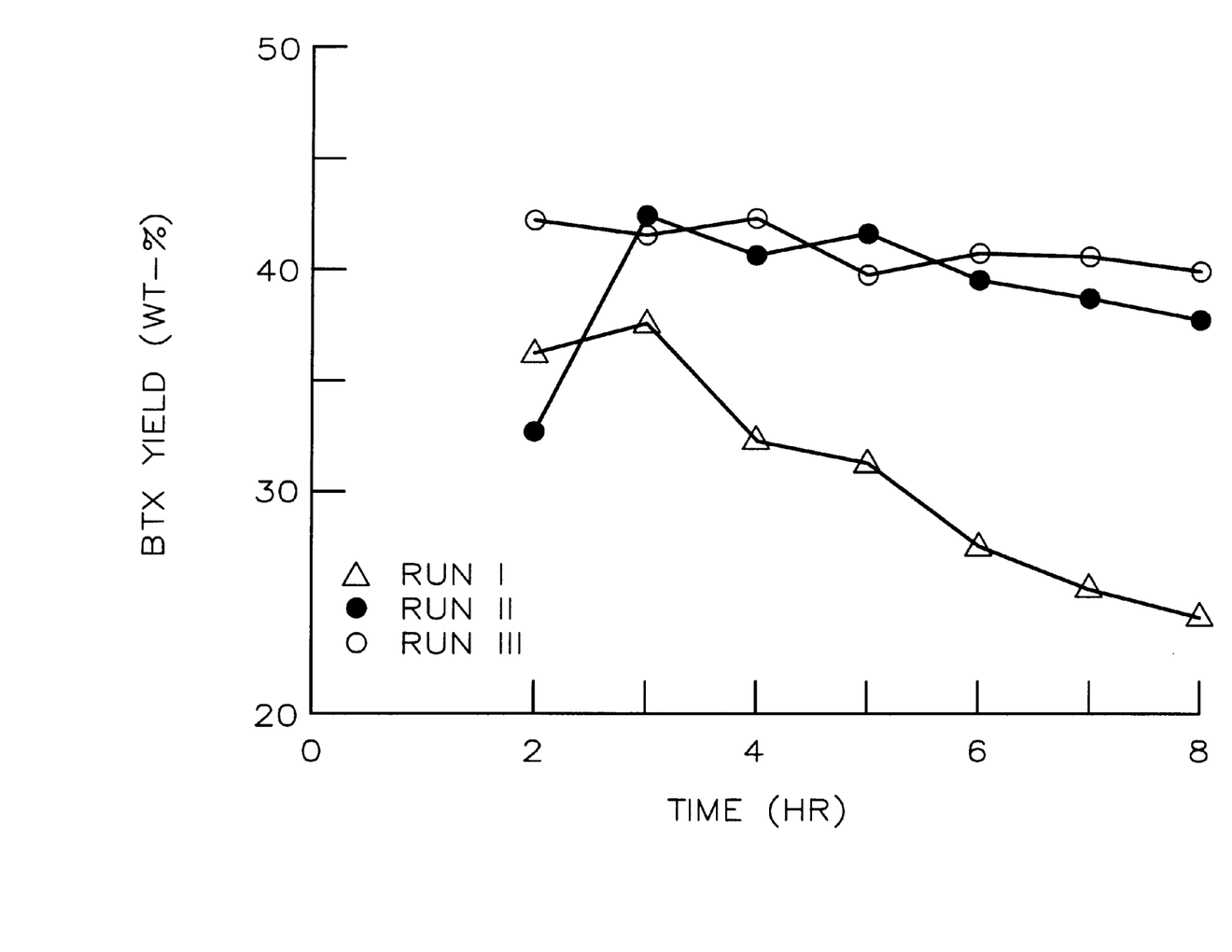
The FIGURE illustrates that the activity (in terms of BTX yield) and stability (in terms of BTX yield over time) of a novel zeolite catalyst composition, prepared by a novel inventive method, can be improved when such catalyst is used in the conversion of hydrocarbons, such as during the upgrading of a thermally-cracked hydrocarbon-containing fluid such as coker naphtha, by pretreating such hydrocarbon-containing fluid with a nitrogen removal medium such as ion-exchange resin.

The inventive composition includes utilizing a zeolite or zeolite material that has not been treated with an acid (i.e., an acid-treating step or acid-leaching step is omitted). The zeolite is combined, or incorporated, with a binder, a boron component, and a zinc component (preferably the boron component and the zinc component are in the form of a zinc borate compound, and, more preferably, the boron component and the zinc component are in the form of zinc hexaborate, $Zn_2B_6O_{11}$), to form a mixture, or combination, wherein such mixture is calcined, to form a calcined mixture, or treated with steam to form a steamed mixture. The resulting calcined mixture can be used to provide an improved benzene concentration in the BTX fraction of the reaction product produced when such resulting calcined mixture is used in the conversion of hydrocarbons, preferably non-aromatic hydrocarbons.

The resulting calcined mixture or the resulting steamed mixture can be used to provide an improved yield of light olefins and a greater olefins-to-aromatics ratio when used in the conversion of hydrocarbons, preferably non-aromatic hydrocarbons, than a catalyst that is made by certain methods other than the inventive method described herein.

The resulting steamed mixture can also be used to provide an improved product containing a high concentration of aromatics (such as BTX), high value light olefins (such as ethylene, propylene, and butylene), and paraffins (such as methane, ethane, and propane) when used in the conversion of a thermally-cracked hydrocarbon-containing fluid, such as coker naphtha. The term "fluid" is used herein to denote gas, liquid, vapor, or combinations thereof.

An important feature of this invention is that the zeolite component of the composition is not treated, or leached, with an acid prior to mixing it with the binder, boron component, and zinc component (preferably the boron component and the zinc component are in the form of a zinc borate compound, and, more preferably, the boron component and the zinc component are in the form of zinc hexaborate, $Zn_2B_6O_{11}$).

The zeolite starting material used in the composition of the invention can be any zeolite or zeolite material which is effective in the conversion of hydrocarbons to aromatic hydrocarbons and light olefin hydrocarbons when contacted under suitable reaction conditions. Examples of suitable zeolites include, but are not limited to, those disclosed in Kirk-Othmer Encyclopedia of Chemical Technology, third edition, volume 15, pages 638–669 (John Wiley & Sons, New York, 1981). Preferably, the zeolite has a constraint index (as defined in U.S. Pat. No. 4,097,367, which is incorporated herein by reference) in the range of from about 0.4 to about 12, preferably in the range of from about 2 to about 9. Generally, the molar ratio of $SiO_2$ to $Al_2O_3$ in the crystalline framework of the zeolite is at least about 5:1 and can range up to infinity. Preferably the molar ratio of $SiO_2$ to $Al_2O_3$ in the zeolite framework is in the range of from about 8:1 to about 200:1, more preferably in the range of from about 12:1 to about 100:1. Preferred zeolites include ZSM-5, ZSM-8, ZSM-11, ZSM-12, ZSM-35, ZSM-38, and combinations thereof. Some of these zeolites are also known as "MFI" or "Pentasil" zeolites. The presently more preferred zeolite is ZSM-5.

An important aspect of this invention is incorporation of a boron component and a zinc component (preferably the boron component and the zinc component are in the form of a zinc borate compound, and, more preferably, the boron component and the zinc component are in the form of zinc hexaborate, $Zn_2B_6O_{11}$) into, onto, or with the zeolite or zeolite material to produce a zeolite catalyst composition without the need to treat, or leach, the zeolite with an acid.

It has been discovered that there are certain benefits from preparing a zeolite catalyst having incorporated therein, thereon, or therewith a boron component and a zinc component (preferably the boron component and the zinc component are in the form of a zinc borate compound, more preferably, the boron component and the zinc component are in the form of zinc hexaborate, $Zn_2B_6O_{11}$) without treating, or leaching, the zeolite with an acid prior to such incorporation. Depending on the use of the zeolite catalyst, such benefits include: lower coke production, an improved (i.e., greater) Olefin-to-BTX ratio in the reaction product, increased concentrations of benzene in the BTX fraction of the reaction product, and upgrading a thermally-cracked hydrocarbon-containing fluid to a product with a high concentration of aromatics. These benefits result from utilizing the improved (i.e., inventive) zeolite catalyst composition.

To prepare the inventive zeolite catalyst composition, a zeolite starting material is mixed, or combined, with a binder, a boron component and a zinc component (preferably the boron component and the zinc component are in the form of a zinc borate compound, and, more preferably, the boron component and the zinc component are in the form of zinc hexaborate, $Zn_2B_6O_{11}$), to form a mixture, or combination, which has not been treated with an acid. The mixture is then calcined, or treated under suitable treatment conditions with steam, to form the inventive zeolite catalyst composition.

The zinc borate compound used in the preparation of the mixture to be calcined, or steam-treated, can be any zinc borate compound that, when incorporated into, onto, or with the starting zeolite material pursuant to the methods and under the conditions described herein, provides a zeolite composition containing a zinc borate compound having desired properties such as good catalytic activity and resistance to coke formation. The zinc borate compound used in this invention may be any anhydrous zinc borate having a general formula $xZnO \cdot yB_2O_3$, or any hydrated zinc borate having a general formula $xZnO \cdot yB_2O_3 \cdot nH_2O$, wherein x=1 to 6 y=1 to 5 n=an integer ranging from 0 to 14.

Non-limiting examples of possible zinc borate compounds include zinc borate, zinc hexaborate, zinc diborate dihydrate, zinc triborate monohydrate, zinc tetraborate pentahydrate, dizinc hexaborate heptahydrate, zinc decaborate (tetrazinc dodecaborate heptahydrate), and the like and combinations thereof. The zinc borate compound is preferably zinc hexaborate. Among the zinc hexaborate compounds the more preferred is dizinc hexaborate heptahydrate ($Zn_2B_6O_{11} \cdot 7H_2O$).

The improved (i.e., inventive) zeolite catalyst composition described herein can also contain an inorganic binder (also called matrix material) preferably selected from the group consisting of alumina, silica, alumina-silica, aluminum phosphate, clays (such as bentonite), calcium aluminate, kaolin, colloidal silica, sodium silicate, titania, and the like and combinations thereof. The most preferred binders are bentonite and colloidal silica.

The relative amounts of a zeolite material, a binder, and a zinc borate compound in the mixture, or combination, to be calcined, or treated with steam, should be such as to provide the inventive zeolite composition having desired properties such as good catalytic activity and resistance to coke formation. Generally, the mixture of a zeolite, a binder, and a zinc borate compound to be calcined, or treated with steam, has a concentration of zeolite in the range of from about 40 weight percent of the mixture (on a total mixture weight basis) to about 99.5 weight percent of the mixture, preferably, in the range of from about 50 weight percent of the mixture to about 90 weight percent of the mixture and, most preferably, in the range from 60 weight percent of the mixture to 80 weight percent of the mixture.

Generally, the mixture of a zeolite, a binder, and a zinc borate compound has a concentration of binder in the range of from about 5 weight percent of the mixture (on a total mixture weight basis) to about 40 weight percent of the mixture, preferably, in the range of from about 10 weight percent of the mixture to about 35 weight percent of the mixture and, most preferably, in the range from 15 weight percent of the mixture to 30 weight percent of the mixture.

Generally, the mixture of a zeolite, a binder, and a zinc borate compound has a concentration of zinc borate compound in the range upwardly to about 30 weight percent of the mixture (on a total mixture weight basis), preferably in the range of from about 0.5 weight percent of the mixture to about 30 weight percent of the mixture, more preferably, in the range of from about 1 weight percent of the mixture to about 25 weight percent of the mixture, and, most preferably, in the range from 2 weight percent of the mixture to 15 weight percent of the mixture.

Any suitable means for mixing a zeolite, a binder, and a zinc borate compound can be used to achieve the desired dispersion of the materials in the resulting mixture. Many of the possible mixing means suitable for use in preparing the mixture of a zeolite, a binder, and a zinc borate compound of the inventive method to make the inventive zeolite catalyst composition are described in detail in *Perry's Chemical Engineers' Handbook, Sixth Edition*, published by McGraw-Hill, Inc., copyright 1984, at pages 21–3 through 21–10, which pages are incorporated herein by reference. Thus, suitable mixing means can include, but are not limited to, such devices as tumblers, stationary shells or troughs, Muller mixers, which are either batch type or continuous type, impact mixers, and the like. It is preferred to use a muller mixer in the mixing of a zeolite, a binder, and a zinc borate compound.

The mixture of a zeolite, a binder, and a zinc borate compound can then be formed or shaped, preferably extruded or granulated. Any suitable means, known to those skilled in the art, for forming, preferably extruding or granulating, the mixture of a zeolite, a binder, and a zinc borate compound can be used to achieve the desired formed mixture, preferably extruded mixture (i.e., extrudate) or granulated mixture (i.e., granulate), of a zeolite, a binder, and a zinc borate compound. A liquid, such as, but not limited to, water, may be used in forming, preferably extruding or granulating, the mixture of a zeolite, a binder, and a zinc borate compound.

Suitable extruding means can include, but are not limited to, such devices as screw extruders (also known as auger extruders or auger-type extruders) and the like. It is preferred to use a screw extruder in the extruding of the mixture of a zeolite, a binder, and a zinc borate compound.

Suitable granulating means can include, but are not limited to, wet granulation and dry granulation. Wet granulation consists of mixing dry ingredients with a liquid such as, but not limited to, water. The resulting wet paste is then dried, coarsely ground, and sieved to the desired size using the proper screen size. Dry granulation consists of densifying dry ingredients in a heavy-duty tableting press to produce granulates which are subsequently crushed to the desired size. It is preferred to use wet granulation in the granulating of the mixture of a zeolite, a binder, and a zinc borate compound.

It can be desirable for the formed mixture to be an agglomerate of the mixture of a zeolite, a binder, and a zinc borate compound. Any suitable means or method(s) known by those skilled in the art for forming such an agglomerate can be used. Such methods include, for example, molding, pressing, pelletizing, tumbling, and densifying. Further discussion of such methods, including extruding means and granulating means, is provided in a section entitled "Size Enlargement" in *Perry's Chemical Engineers' Handbook, Sixth Edition*, published by McGraw-Hill, Inc., copyright 1984, at pages 8–60 through 8–72, which pages are incorporated herein by reference.

Generally, the zeolite, binder, and zinc borate components are compounded and subsequently shaped (such as by pelletizing, extruding or granulating) into a compounded composition. Generally, the surface area of the compounded composition is in the range of from about 50 $m^2/g$ to about 700 $m^2/g$. Generally, the particle size of the compounded composition is in the range of from about 1 mm to about 10 mm.

The mixture, preferably formed mixture, more preferably extruded mixture or granulated mixture, of a zeolite, a binder, and a zinc borate compound can be subjected to drying conditions in an atmosphere of air or inert gas (such as, but not limited to, $N_2$, $H_2$, argon, and the like and combinations thereof) by any method(s) known to one skilled in the art. Drying the mixture is generally carried out at a temperature in the range of from about 20° C. to about 200° C., preferably at a temperature in the range of from about 50° C. to about 175° C., and most preferably at a temperature in the range from 100° C. to 150° C. Drying the mixture is generally carried out at ambient pressure (i.e., about 14.7 pounds per square inch absolute) or, can be carried out under vacuum conditions. Preferably, the drying pressure is in the range of from about ambient pressure upwardly to about 25 pounds per square inch absolute. The rate of drying is controlled so as to avoid surges of water vapor and splattering. Drying times can be in the range of from about 0.5 hour to about 50 hours, preferably the drying time can be in the range of from about 1 hour to about 30 hours, and, most preferably, the drying time can be in the range from 1.5 hours to 20 hours. The presently preferred drying is in a convection oven, under any pressure, at a temperature in the range of from about 110° C. to about 180° C. for a time period of from about 2 hours to about 16 hours.

The dried mixture, preferably dried, formed mixture, more preferably dried, extruded mixture or dried, granulated mixture, of a zeolite, a binder, and a zinc borate compound can then be calcined, by any method(s) known to one skilled in the art, to give a final calcined zeolite catalyst composition having desirable properties such as good catalytic activity and resistance to coke formation.

The dried mixture, preferably dried, formed mixture, more preferably dried, extruded mixture or dried, granulated mixture, of a zeolite, a binder, and a zinc borate compound can also be treated by exposing such mixture to a predominantly gaseous atmosphere, preferably an entirely gaseous atmosphere, comprising steam to give a final steamed zeolite catalyst composition having desirable properties such as good catalytic activity and resistance to coke formation.

Calcining the dried mixture, preferably dried, formed mixture, more preferably dried, extruded mixture or dried, granulated mixture, of a zeolite, a binder and a zinc borate compound may be conducted at any pressure conditions and at any temperature conditions that suitably provide a final calcined zeolite catalyst composition. Preferably, the dried mixture of a zeolite, a binder and a zinc borate is calcined in air.

Generally, the calcination may be conducted at a pressure in the range of from about 7 pounds per square inch absolute (psia) to about 750 psia, preferably in the range of from about atmospheric pressure (i.e., about 14.7 psia) to about 450 psia, and most preferably in the range from atmospheric pressure to 150 psia. The calcination temperature is generally in the range of from about 100° C. to about 1500° C. Preferably, the calcination temperature is in the range of from about 200° C. to about 800° C. and, most preferably, the calcination temperature is in the range from 250° C. to 700° C.

The time period for conducting the calcination is generally in the range of from about 1 hour to about 30 hours. Preferably, the calcination is conducted for a time period in the range of from about 2 hours to about 20 hours and, most preferably, the calcination is conducted for a time period in the range from 3 hours to 15 hours.

The dried mixture, preferably dried, formed mixture, more preferably dried, extruded mixture or dried, granulated mixture, of a zeolite, a binder, and a zinc borate compound, may also be subjected to steaming conditions by exposing such mixture to a predominantly gaseous atmosphere, preferably an entirely gaseous atmosphere, comprising steam and, optionally, an inert carrier such as nitrogen or helium to give a final steamed zeolite catalyst composition. The steam atmosphere, excluding the inert carrier, preferably has a concentration of steam exceeding about 90 molar percent and, most preferably, the concentration of the steam atmosphere exceeds about 95 molar percent.

Treating the dried mixture of a zeolite, a binder, and a zinc borate compound with steam may be conducted at any pressure conditions and at any temperature conditions that suitably provide a final steamed zeolite catalyst composition.

Generally, the steam treatment may be conducted at a pressure in the range of from below atmospheric upwardly to about 3000 pounds per square inch absolute (psia). More typical pressures, however, are in the range of from about atmospheric to about 2500 psia. The steam treatment temperature is generally in the range of from about 100° C. to about 1500° C. Preferably, the steam treatment temperature is in the range of from about 120° C. to about 1300° C. and, more preferably, the steam treatment temperature is in the range from 150° C. to 800° C. It is preferred for the steam to be superheated and not saturated.

Generally, the time period for exposing the mixture of a zeolite, a binder, and a zinc borate compound to a steam atmosphere at the appropriate temperature conditions and appropriate pressure conditions can be in the range of from about 0.1 hour to about 30 hours. Preferably, the steam treatment step is conducted for a time period in the range of from about 0.25 hour to about 25 hours and, most preferably, the steam treatment step is conducted for a time period in the range from 0.5 hour to 20 hours.

Generally, the final calcined zeolite catalyst composition or final steamed zeolite catalyst composition has a concentration of zeolite in the range of from about 40 weight percent of the composition (on a total composition weight basis) to about 95 weight percent of the composition, preferably, in the range of from about 50 weight percent of the composition to about 90 weight percent of the composition and, most preferably, in the range from 60 weight percent of the composition to 85 weight percent of the composition.

Generally, the final calcined zeolite catalyst composition or final steamed zeolite catalyst composition has a concentration of binder in the range of from about 5 weight percent of the composition (on a total composition weight basis) to about 50 weight percent of the composition, preferably, in the range of from about 8 weight percent of the composition to about 40 weight percent of the composition and, most preferably, in the range from 10 weight percent of the composition to 30 weight percent of the composition.

Generally, the final calcined zeolite catalyst composition or final steamed zeolite catalyst composition has a concentration of zinc borate compound in the range upwardly to about 30 weight percent of the composition (on a total composition weight basis), preferably, in the range of from about 0.5 weight percent of the composition to about 30 weight percent of the composition, more preferably, in the range of from about 1 weight percent of the composition to about 25 weight percent of the composition, and, most preferably, in the range from 2 weight percent of the composition to 20 weight percent of the composition.

Generally, the concentration of zinc in the zinc borate compound in the final calcined zeolite catalyst composition or final steamed zeolite catalyst composition is in the range upwardly to about 40 weight percent of the composition (on a total composition weight basis), preferably, in the range of from about 0.3 weight percent of the composition to about 40 weight percent of the composition, more preferably, in the range of from about 0.5 weight percent of the composition to about 30 weight percent of the composition, and, most preferably, in the range from 0.7 weight percent of the composition to 20 weight percent of the composition.

Generally, the concentration of boron in the zinc borate compound in the final calcined zeolite catalyst composition or final steamed zeolite catalyst composition is in the range upwardly to about 20 weight percent of the composition (on a total composition weight basis), preferably, in the range of from about 0.1 weight percent of the composition to about 20 weight percent of the composition, more preferably, in the range of from about 0.3 weight percent of the composition to about 15 weight percent of the composition, and, most preferably, in the range from 0.4 weight percent of the composition to 10 weight percent of the composition.

Any suitable hydrocarbon-containing fluid which comprises paraffins (alkanes) and/or olefins (alkenes) and/or naphthenes (cycloalkanes), wherein each of these hydrocarbons contains in the range of from about 5 carbon atoms per molecule to about 16 carbon atoms per molecule can be used as the fluid to be contacted with the zeolite catalyst compositions described herein under suitable process conditions for obtaining a reaction product, i.e., conversion product, comprising light olefins (alkenes, such as ethylene and propylene) containing in the range of from about 2 carbon atoms per molecule to about 5 carbon atoms per molecule and aromatic hydrocarbons (such as BTX, i.e., benzene, toluene, and xylene). Frequently, the suitable hydrocarbon-containing fluid also contains aromatic hydrocarbons. The term "fluid" is used herein to denote gas, liquid, vapor, or combinations thereof.

Non-limiting examples of suitable, available hydrocarbon-containing fluid include gasolines from catalytic oil cracking (e.g., FCC and hydrocracking) processes, pyrolysis gasolines from thermal hydrocarbon-(e.g., ethane, propane, and naphtha) cracking processes, naphthas, gas oils, reformates, straight-run gasoline and the like and combinations thereof The preferred hydrocarbon-containing fluid is a gasoline-boiling range hydrocarbon-containing fluid suitable for use as at least a gasoline blend stock generally having a boiling range of about 30° C. to about 210° C.

Another suitable hydrocarbon-containing fluid may also comprise a thermally-cracked hydrocarbon-containing fluid which boils in the gasoline boiling range. The preferred hydrocarbon-containing fluid of this type is coker naphtha although other thermally-produced fluid(s) such as pyrolysis gasoline may also be used. Coker naphthas are unsaturated fractions containing significant amounts of diolefins as a result of the thermal cracking. Coker naphtha is obtained by coking processes, i.e., thermal cracking of a residual fluid, such as a crude oil residual fluid, in a coker. As mentioned above, coking processes are well-established in the petroleum refining industry and are used to convert residual fluid into higher value liquid products. Because the coking process(es) are known to one skilled in the art, the description of such coking process(es) is omitted herein.

Depending on the mode of operation of the coker and refinery requirements, coker naphthas may include: light naphthas (typically having a boiling range of from about 50° C. to about 165° C.), full range naphthas (typically having a boiling range of from about 25° C. to about 215° C.), heavier naphtha fractions (typically having a boiling range of from about 125° C. to about 210° C.), or heavy gasoline fractions (typically having a boiling range of from about 165° C. to about 260° C.). In addition, the present process may be operated with the entire naphtha fraction obtained from the coker or with a part of the naphtha fraction obtained from the coker. Extensive analytical results of the composition of coker naphtha and some of the characteristics of coker naphtha are disclosed in U.S. Pat. No. 4,711,968.

The hydrocarbon-containing fluid can be subjected to a contacting step wherein such hydrocarbon-containing fluid is contacted by any suitable means, method(s), or manner with the zeolite catalyst composition, described herein, contained within a reaction zone, i.e., conversion zone. The contacting step can be operated as a batch process step or, preferably, as a continuous process step. In the latter operation, a solid catalyst bed, or a moving catalyst bed, or a fluidized catalyst bed can be employed. Any of these operational modes have advantages and disadvantages, and those skilled in the art can select the one most suitable for a particular fluid and catalyst.

In a preferred operational mode, the hydrocarbon-containing fluid is subjected to a pretreating step wherein such hydrocarbon-containing fluid is pretreated within a pretreatment zone wherein is contained a nitrogen removal medium, preferably ion-exchange resin, before such hydrocarbon-containing fluid is passed to a conversion zone to be contacted with the zeolite catalyst composition. Non-limiting suitable examples of ion-exchange resin are Amberlyst-15, Amberlyst XN-1005, Amberlyst XN-1008, Amberlyst XN-1010, Amberlyst XN-1011, Amberlite 200, Amberlite-IR-120, and combinations thereof. More preferably, the ion-exchange resin is Amberlite-IR-120 ion-exchange resin (provided by Rohm & Haas Co.) or Amberlyst 15 ion-exchange resin (also provided by Rohm & Haas Co.).

The pretreating step can be done by any suitable means, method(s), or manner known in the art for pretreating a hydrocarbon-containing fluid with a nitrogen removal medium such as, preferably, ion-exchange resin. The pretreating step can be operated as a batch process step or, preferably, as a continuous process step preferably preceding the contacting step. In a preferred operation, the pretreatment zone comprises a solid ion-exchange resin bed employed preceding (i.e., upstream of) a conversion zone comprising a solid catalyst bed, or moving catalyst bed, or fluidized catalyst bed, containing the zeolite catalyst composition. Any of these operational modes have advantages and disadvantages, and those skilled in the art can select the one most suitable for a particular fluid, nitrogen removal medium, and zeolite catalyst composition.

The pretreating step is preferably carried out under pretreating conditions that suitably promote the reduction of the concentration of nitrogen compounds, preferably the removal of nitrogen compounds, from the hydrocarbon-containing fluid. Thus, the resulting pretreated hydrocarbon-containing fluid, containing a reduced level of nitrogen compounds, can then be passed to a conversion zone to promote the formation of aromatics, preferably BTX, from at least a portion of the hydrocarbons of the hydrocarbon-containing fluid.

Pretreating conditions would include a pretreating temperature in the range of from about 0° C. to about 550° C., more preferably in the range of from about 10° C. to about 200° C. and, most preferably, in the range from 20° C. to 150° C. The pretreating pressure can be in the range of from below atmospheric pressure upwardly to about 500 pounds per square inch absolute (psia), preferably, the pretreating pressure can be in the range of from about atmospheric pressure to about 450 psia and, most preferably, the pretreating pressure can be from atmospheric pressure to 400 psia.

The flow rate at which the hydrocarbon-containing fluid is charged to the pretreatment zone (i.e., the pretreating charge rate of hydrocarbon-containing fluid) is such as to provide a pretreating weight hourly space velocity ("pretreating WHSV") in the range of from exceeding 0 hour$^{-1}$ upwardly to about 1000 hour$^{-1}$. The term "pretreating weight hourly space velocity", as used herein, shall mean the numerical ratio of the rate at which a hydrocarbon-containing fluid is charged to the pretreatment zone in pounds per hour divided by the pounds of nitrogen removal medium, preferably ion-exchange resin, contained in the pretreatment zone to which the hydrocarbon-containing fluid is charged. The preferred pretreating WHSV of the hydrocarbon-containing fluid to the pretreatment zone can be in the range of from about 0.25 hour$^{-1}$ to about 250 hour$^{-1}$ and, most preferably in the range from 0.5 hour$^{-1}$ to 100 hour$^{-1}$.

The contacting step is preferably carried out within a conversion zone, wherein is contained the zeolite catalyst composition, and under reaction conditions, i.e., conversion conditions, that suitably promote the formation of aromatics, preferably BTX, from at least a portion of the hydrocarbons of the hydrocarbon-containing fluid, preferably pretreated hydrocarbon-containing fluid. Thus, the reaction product, i.e., the conversion product, includes aromatics.

Conversion conditions would include a reaction temperature of the contacting step preferably in the range of from about 400° C. to about 800° C., more preferably in the range of from about 450° C. to about 750° C. and, most preferably, in the range from 500° C. to 700° C. The contacting pressure can be in the range of from below atmospheric pressure upwardly to about 500 pounds per square inch absolute (psia), preferably, the contacting pressure can be in the range of from about atmospheric pressure to about 450 psia and, most preferably, the contacting pressure can be in the range from atmospheric pressure to 400 psia.

The flow rate at which the hydrocarbon-containing fluid is charged to the conversion zone (i.e., the contacting charge rate of hydrocarbon-containing fluid) is such as to provide a contacting weight hourly space velocity ("contacting WHSV") in the range of from exceeding 0 hour$^{-1}$ upwardly to about 1000 hour$^{-1}$. The term "contacting weight hourly space velocity", as used herein, shall mean the numerical ratio of the rate at which a hydrocarbon-containing fluid is charged to the conversion zone in pounds per hour divided by the pounds of catalyst contained in the conversion zone to which the hydrocarbon-containing fluid is charged. The preferred contacting WHSV of the hydrocarbon-containing fluid to the conversion zone can be in the range of from about 0.25 hour$^{-1}$ to about 250 hour$^{-1}$ and, most preferably in the range from 0.5 hour$^{-1}$ to 100 hour$^{-1}$.

The process effluent, from the conversion zone, generally contains: a light gas fraction comprising hydrogen and methane, a $C_2$–$C_3$ fraction comprising ethylene, propylene, ethane, and propane, an intermediate fraction comprising non-aromatic compounds having greater than 3 carbon atoms, a BTX aromatic hydrocarbons fraction comprising benzene, toluene, ortho-xylene, meta-xylene, para-xylene, and also ethylbenzene (i.e., BTX aromatic hydrocarbons), and a $C_9$+ ("heavies") fraction which contains aromatic compounds having 9 or more carbon atoms per molecule.

Generally, the process effluent can be separated into these principal fractions by any known method(s) such as, for example, fractionation distillation. Because the separation method(s) are known to one skilled in the art, the description of such separation method(s) is omitted herein. The intermediate fraction can be fed to an aromatization reactor to be converted to aromatic hydrocarbons. The methane, ethane, and propane can be used as fuel gas or as a feed for other reactions such as, for example, in a thermal cracking process to produce ethylene and propylene. The olefins can be recovered and further separated into individual olefins by any method(s) known to one skilled in the art. The individual olefins can then be recovered and marketed. The BTX fraction can be further separated into individual $C_6$ to $C_8$ aromatic hydrocarbon fractions. Alternatively, the BTX fraction can further undergo one or more reactions either before or after separation to individual $C_6$ to $C_8$ hydrocarbons so as to increase the content of the most desired BTX aromatic hydrocarbon. Suitable examples of such subsequent $C_6$ to $C_8$ aromatic hydrocarbon conversions are disproportionation of toluene (to form benzene and xylenes), transalkylation of benzene and xylenes (to form toluene), and isomerization of meta-xylene and/or ortho-xylene to para-xylene.

After the nitrogen removal medium, preferably ion-exchange resin, has been deactivated (i.e., contaminated) by, for example, refinery feed poisons, to an extent that the nitrogen removal capability of the nitrogen removal medium has become unsatisfactory, the nitrogen removal medium, preferably ion-exchange resin, may be replaced with new nitrogen removal medium or, preferably, reactivated by any means or method(s) known to one skilled in the art such as, for example, acid washing. The optimal temperatures and time periods for acid washing the ion-exchange resin depend generally on the types and amounts of deactivating deposits on such resin. These optimal temperatures and time periods can easily be determined by those possessing ordinary skill(s) in the art and are omitted herein for the interest of brevity.

After the improved zeolite catalyst composition has been deactivated by, for example, coke deposition or feed poisons, to an extent that the feed conversion and/or the selectivity has become unsatisfactory, the improved (i.e., inventive) zeolite catalyst composition can be reactivated by any means or method(s) known to one skilled in the art such as, for example, calcining in air to burn off deposited coke and other carbonaceous materials, such as oligomers or polymers, preferably at a temperature in the range of from about 400° C. to about 1000° C. The optimal time periods of the calcining depend generally on the types and amounts of deactivating deposits on the zeolite catalyst composition and on the calcination temperatures. These optimal time periods can easily be determined by those possessing ordinary skill(s) in the art and are omitted herein for the interest of brevity.

The following examples are presented to further illustrate this invention and are not to be construed as unduly limiting the scope of this invention.

EXAMPLE I

This example illustrates the preparation of several catalysts which were subsequently tested as catalysts in the conversion of hydrocarbon-containing fluids.

Acid-Treated ZSM-5 Zeolite Catalyst

A commercially available ZSM-5 zeolite catalyst (provided by United Catalysts Inc., Louisville, Ky., under product designation "T-4480" obtained as $\frac{1}{16}$ inch extrudate) was treated with acid. To treat the catalyst with acid, the catalyst was soaked in an aqueous hydrochloric acid (HCl) solution, having a concentration of 19 weight percent HCl (approximately 6N), for two hours at a constant temperature of about 90° C. After soaking, the catalyst was separated from the acid solution and thoroughly washed with water and dried. The acid-soaked, washed, and dried catalyst was calcined in air at a temperature of about 525° C. for four hours.

Catalyst A (Control)

A 10 gram quantity of the above-described, acid-treated ZSM-5 zeolite catalyst (commercially available "T-4480" treated with acid, as described above) was impregnated, by an incipient wetness impregnation technique (i.e., essentially completely filling the pores of the substrate material with a solution of the incorporating elements), with a solution containing 1.08 grams of hydrated zinc nitrate ($Zn(NO_3)_2 \cdot 6H_2O$), 0.45 grams of boric acid ($H_3BO_3$), and 8.47 grams of deionized water. This acid-treated, impregnated zeolite was then dried in air at 125° C. for 16 hours. The acid-treated, impregnated, dried zeolite was then treated in a steam atmosphere for 6 hours at 650° C. with a $H_2O$ flow rate of 20 ml/hr followed by calcining in helium for 2 hours at 538° C. with a helium flow rate of 50 ml/min. A final product weighing 10.26 grams was obtained. The final product contained a boron (B) concentration of 0.77 percent of the total weight of the final product (i.e., 0.77 weight percent B). The final product also contained a zinc (Zn) concentration of 2.31 percent of the total weight of the final product (i.e., 2.31 weight percent Zn). The final product had an atomic ratio of boron to zinc of 2:1.

Catalyst B (Control)

A 100 gram quantity of commercially available ZSM-5 zeolite Zeocat PZ2/50H powder (provided by Chemie Uetikon) was mixed with 25 grams of bentonite to form a mixture. A sufficient quantity of deionized water was then added to the mixture so as to provide for an extrudable paste which was extruded. The extrudate was then dried at room temperature (about 20° C. to about 25° C.) and atmospheric pressure (about 14.7 pounds per square inch absolute) for about 2 hours and then calcined in air for 3 hours at 500° C. A 50 gram quantity of this dried and calcined zeolite-bentonite extrudate was impregnated, by an incipient wetness impregnation technique (i.e., essentially completely filling the pores of the substrate material with a solution of the incorporating elements), with a solution containing 10.8 grams of hydrated zinc nitrate ($Zn(NO_3)_2 \cdot 6H_2O$), 4.5 grams of boric acid ($H_3BO_3$), and 84.7 grams of deionized water.

This impregnated zeolite-bentonite extrudate was then dried at 125° C. and atmospheric pressure (i.e., about 14.7 pounds per square inch absolute) for about 3 hours. A 25 gram quantity of the thus-dried impregnated zeolite-bentonite extrudate was then calcined in air for 3 hours at a temperature of 500° C. The thus-calcined impregnated zeolite-bentonite extrudate was then treated in a steam atmosphere for 8 hours at 650° C. with a $H_2O$ flow rate of 20 ml/hr and a helium flow rate of 500 cc/min. A final product weighing about 25 grams was obtained. The final product contained a boron (B) concentration of 0.62 percent of the total weight of the final product (i.e., 0.62 weight percent B). The final product also contained a zinc (Zn) concentration of 1.88 percent of the total weight of the final product (i.e., 1.88 weight percent Zn).

Catalyst C (Invention)

A 20 gram quantity of commercially available ZSM-5 zeolite Zeocat PZ2/50H powder (provided by Chemie Uetikon) was mixed with 5 grams of bentonite and 2 grams of $Zn_2B_6O_{11} \cdot 7H_2O$ (dizinc hexaborate heptahydrate, provided by Alfa AESAR, Ward Hill, Mass. under the product designation, zinc hexaborate, 98%) to form a mixture. A 39 ml quantity of deionized water was then added to the mixture so as to provide for an extrudable paste which was extruded. The extrudate was then dried at about 125° C. and atmospheric pressure (about 14.7 pounds per square inch absolute) for about 3 hours. The thus-dried zeolite-bentonite-zinc borate extrudate was then treated in a steam atmosphere for 4 hours at 650° C. with a $H_2O$ flow rate of 20 ml/hr and a helium flow rate of 500 cc/min. A final product weighing about 25 grams was obtained. The final product contained 0.26 grams of boron (B) resulting in a boron concentration of 1.0 percent of the total weight of the final product (i.e., 1.0 weight percent B). The final product also contained 0.53 grams of zinc (Zn) resulting in a zinc concentration of 2.1 percent of the total weight of the final product (i.e., 2.1 weight percent Zn).

Catalyst D (Invention)

A 20 gram quantity of commercially available ZSM-5 zeolite Zeocat PZ2/50H powder (provided by Chemie Uetikon) was mixed with 5 grams of bentonite and 2 grams of $Zn_3B_4O_9 \cdot 5H_2O$ (trizinc tetraborate pentahydrate, provided by Pfaltz & Bauer, Inc., Waterbury, Conn. under the product designation, zinc borate) to form a mixture. A 22 ml quantity of deionized water was then added to the mixture so as to provide for an extrudable paste which was extruded. The extrudate was then dried at about 125° C. and atmospheric pressure (about 14.7 pounds per square inch absolute) for about 3 hours. The thus-dried zeolite-bentonite-zinc borate extrudate was then treated in a steam atmosphere for 4 hours at 650° C. with a $H_2O$ flow rate of 20 ml/hr and a helium flow rate of 500 cc/min. A final product weighing about 25 grams was obtained. The final product contained 0.18 grams of boron (B) resulting in a boron concentration of 0.7 percent of the total weight of the final product (i.e., 0.7 weight percent B). The final product also contained 0.83 grams of zinc (Zn) resulting in a zinc concentration of 3.3 percent of the total weight of the final product (i.e., 3.3 weight percent Zn).

Catalyst E (Invention)

A 20 gram quantity of commercially available ZSM-5 zeolite Zeocat PZ2/50H powder (provided by Chemie Uetikon) was mixed with 5 grams of bentonite and 2 grams of $Zn_2B_6O_{11} \cdot 7H_2O$ (dizinc hexaborate heptahydrate, provided by Alfa AESAR, Ward Hill, Mass. under the product designation, zinc hexaborate, 98%) to form a mixture. A 21 ml quantity of deionized water was then added to the mixture so as to provide for an extrudable paste which was extruded. The extrudate was then dried at about 125° C. and atmospheric pressure (about 14.7 pounds per square inch absolute) for about 3 hours. The thus-dried zeolite-bentonite-zinc borate extrudate was then calcined in air for 3 hours at a temperature of 500° C. The calcination was done in lieu of a steam treatment. A final product weighing about 25 grams was obtained. The final product contained 0.26 grams of boron (B) resulting in a boron concentration of 1.04 percent of the total weight of the final product (i.e., 1.04 weight percent B). The final product also contained 0.53 grams of zinc (Zn) resulting in a zinc concentration of 2.12 percent of the total weight of the final product (i.e., 2.12 weight percent Zn).

Catalyst F (Invention)

A 28 gram quantity of commercially available ZSM-5 zeolite Zeocat PZ2/50H powder (provided by Chemie Uetikon) was mixed with 1.4 grams of $Zn_2B_6O_{11} \cdot 7H_2O$ (dizinc hexaborate heptahydrate, provided by Alfa AESAR, Ward Hill, Mass. under the product designation, zinc hexaborate, 98%) and 30 grams of colloidal silica (provided by Aldrich Chemical Company, Inc., Milwaukee, Wis., under the product designation of "LUDOX AS-40" (40 wt-% suspension of silica in water)) to form a paste. The paste was then dried at about 125° C. and atmospheric pressure (about 14.7 pounds per square inch absolute) for about 3 hours. The thus-dried zeolite-silica-zinc borate paste was then coarsely ground and sieved to a particle (i.e., granulate) size of between 12 and 20 mesh. The thus-dried zeolite-silica-zinc borate granulate was then treated in a steam atmosphere for 4 hours at 650° C. with a $H_2O$ flow rate of 20 ml/hr and a helium flow rate of 500 cc/min. A final product weighing 22.8 grams was obtained. The final product contained 0.1 grams of boron (B) resulting in a boron concentration of 0.44 percent of the total weight of the final product (i.e., 0.44 weight percent B). The final product also contained 0.2 grams of zinc (Zn) resulting in a zinc concentration of 0.89 percent of the total weight of the final product (i.e., 0.89 weight percent Zn).

Catalyst G (Invention)

A 28 gram quantity of commercially available ZSM-5 zeolite Zeocat PZ2/50H powder (provided by Chemie Uetikon) was mixed with 2.8 grams of $Zn_2B_6O_{11} \cdot 7H_2O$ (dizinc hexaborate heptahydrate, provided by Alfa AESAR, Ward Hill, Mass. under the product designation, zinc hexaborate, 98%) and 25 ml of colloidal silica (provided by Aldrich Chemical Company, Inc., Milwaukee, Wis., under the product designation of "LUDOX AS-40" (40 wt-% suspension of silica in water)) to form a paste. The paste was then dried at about 125° C. and atmospheric pressure (about 14.7 pounds per square inch absolute) for about 3 hours. The thus-dried zeolite-silica-zinc borate paste was then coarsely ground and sieved to a particle (i.e., granulate) size of between 12 and 20 mesh. The preparation procedure was then repeated in order to double the quantity of thus-dried zeolite-silica-zinc borate granulate. The thus-dried zeolite-silica-zinc borate granulate was then treated in a steam atmosphere for 4 hours at 650° C. with a $H_2O$ flow rate of 20 ml/hr and a helium flow rate of 500 cc/min. A final product weighing 22.8 grams was obtained. The final product contained 0.2 grams of boron (B) resulting in a boron concentration of 0.88 percent of the total weight of the final product (i.e., 0.88 weight percent B). The final product also contained 0.4 grams of zinc (Zn) resulting in a zinc concentration of 1.78 percent of the total weight of the final product (i.e., 1.78 weight percent Zn).

EXAMPLE II

This example illustrates the use of the catalysts described in Example I as catalysts in the conversion of a catalytically-cracked gasoline boiling range fluid to light olefins (such as, ethylene and propylene) and aromatics (such as, benzene, toluene, and xylene, i.e., BTX).

For each of the test runs, a 5.0 g sample of each catalyst material described in Example I was placed into a stainless steel tube reactor (length: about 18 inches; inner diameter: about 0.5 inch). Gasoline boiling range fluid from a catalytic cracking unit of a refinery was passed through the reactor at a flow rate of about 14 ml/hour, at a temperature of about 600° C., and at atmospheric pressure (about 0 pounds per square inch gauge). The formed reaction product exited the reactor tube and passed through several ice-cooled traps. The liquid portion remained in these traps and was weighed, whereas the volume of the gaseous portion which exited the traps was measured in a "wet test meter". Liquid and gaseous product samples (collected at hourly intervals) were analyzed by means of a gas chromatograph. Results of the test runs for Catalysts A (Control), B (Control), C (Invention), and D (Invention) are summarized in Table I. All test data were obtained after 8 hours on stream.

TABLE I

| Catalyst | Catalyst Preparation | BTX Yield (wt-%) | Light Olefin[a] Yield (wt-%) | Sum of BTX and Olefin | Olefin/ BTX Ratio | Avg wt-% Coke/hr[b] |
|---|---|---|---|---|---|---|
| A (Control) | (AL + IMP)[c] | 39.0 | 20.7 | 59.7 | 0.53 | 0.3 |
| B (Control) | (EXT + IMP)[d] | 50.0 | 7.6 | 57.6 | 0.15 | 0.7 |
| C (Invention) | (EXT w/B$_6$ + STM)[e] | 42.1 | 20.1 | 62.2 | 0.48 | 0.2 |
| D (Invention) | (EXT w/B$_4$ + STM)[f] | 34.0 | 21.6 | 55.6 | 0.64 | 0.2 |

[a]Ethylene and Propylene
[b]Coke was determined at the end of the reaction by removing the catalysts from the reactor and measuring the coke with a thermal gravimetric analyzer (TGA), manufactured by TA Instruments, New Castle, Delaware.
[c]Acid-leached Zeolite Impregnated with Zinc Nitrate and Boric Acid.
[d]Zeolite-Bentonite Extrudate Impregnated with Zinc Nitrate and Boric Acid (Zeolite was Not Acid-Leached).
[e]Zeolite-Bentonite-Zinc Hexaborate Extrudate Dried and Steamed (Zeolite was Not Acid-Leached).
[f]Zeolite-Bentonite-Zinc Tetraborate Extrudate Dried and Steamed (Zeolite was Not Acid-Leached).

The test data presented in Table I clearly show that Invention Catalysts C and D exhibited considerably less coking than Control Catalysts A and B. Invention Catalyst D also exhibited an improved (i.e., greater) Olefin-to-BTX ratio when compared to Control Catalysts A and B. Invention Catalyst C exhibited an improved (i.e., greater) Olefin-to-BTX ratio when compared to Control Catalyst B. The improvement in catalyst performance is believed to be due to the novel process of making the inventive catalyst by drying and steaming a zeolite-bentonite-zinc hexaborate extrudate or zeolite-bentonite-zinc tetraborate extrudate. The improvement in catalyst performance is also significant given the fact that Invention Catalysts C and D use a zeolite that has not been acid-treated or acid-leached.

The difference in performance between the invention catalysts and the control catalysts is certainly unexpected. One would not expect that drying and steaming a non-acid-leached-zeolite-bentonite-zinc hexaborate extrudate, or non-acid-leached-zeolite-bentonite-zinc tetraborate extrudate, in lieu of impregnating an acid-leached zeolite with zinc nitrate and boric acid, would enhance the performance of the final inventive zeolite catalyst compositions. One would also not expect that drying and steaming a non-acid-leached-zeolite-bentonite-zinc hexaborate extrudate, or non-acid-leached-zeolite-bentonite-zinc tetraborate extrudate, in lieu of impregnating a non-acid-leached-zeolite-bentonite extrudate with zinc nitrate and boric acid, would enhance the performance of the final inventive zeolite catalyst compositions.

The results demonstrate that the invention catalysts, in which a non-acid-leached-zeolite-bentonite-zinc hexaborate extrudate, or non-acid-leached-zeolite-bentonite-zinc tetraborate extrudate, is dried and steamed, as opposed to impregnating an acid-leached zeolite, or non-acid-leached-zeolite-bentonite extrudate, with zinc nitrate and boric acid, gives a catalyst that is significantly superior to the control catalysts.

EXAMPLE III

This example illustrates that the Invention Catalysts described in Example I can be used to modify the yields of aromatics (such as, BTX) and light olefins (such as, ethylene and propylene) in the conversion of a catalytically-cracked gasoline boiling range fluid. Each test run was conducted in the same manner as described above for Example II. Results of the test runs for Catalysts B (Control), C (Invention), and E (Invention) are summarized in Table II. All test data were obtained after 8 hours on stream.

TABLE II

| Catalyst | Catalyst Preparation | BTX Yield (wt-%) | Light Olefin[a] Yield (wt-%) | Sum of BTX and Olefin | Olefin/ BTX Ratio | Avg wt-% Coke/hr[b] |
|---|---|---|---|---|---|---|
| B (Control) | (EXT + IMP)[c] | 50.0 | 7.6 | 57.6 | 0.15 | 0.7 |
| C (Invention) | (EXT w/B$_6$ + STM)[d] | 42.1 | 20.1 | 62.2 | 0.48 | 0.2 |
| E (Invention) | (EXT w/B$_6$ + STM)[e] | 47.7 | 13.7 | 61.4 | 0.29 | 0.4 |

[a]Ethylene and Propylene
[b]Coke was determined at the end of the reaction by removing the catalysts from the reactor and measuring the coke with a thermal gravimetric analyzer (TGA), manufactured by TA Instruments, New Castle, Delaware.
[c]Zeolite-Bentonite Extrudate Impregnated with Zinc Nitrate and Boric Acid (Zeolite was Not Acid-Leached).
[d]Zeolite-Bentonite-Zinc Hexaborate Extrudate Dried and Steamed (Zeolite was Not Acid-Leached).
[e]Zeolite-Bentonite-Zinc Hexaborate Extrudate Dried and Calcined (Zeolite was Not Acid-Leached).

The test data presented in Table II clearly show that the novel methods of preparing the invention catalysts can have an impact on the yield of aromatics and light olefins. Invention Catalyst C, made by the novel process of steaming a zeolite-bentonite-zinc hexaborate extrudate, exhibited higher yields of light olefins and lower yields of aromatics than the calcined Invention Catalyst E. Invention Catalyst E, made by the novel process of calcining, in lieu of steaming, a zeolite-bentonite-zinc hexaborate extrudate, produced an unexpected and opposite result of lower yields of light olefins and higher yields of aromatics than the steamed Invention Catalyst C.

The test data indicates that the octane ratings of low octane streams can be maximized by increasing the yield of aromatics and minimizing the yield of light olefins by using Invention Catalyst E. The opposite result, of minimizing the yield of aromatics and maximizing the yield of light olefins, can be obtained by using Invention Catalyst C.

In addition, Invention Catalyst E exhibited considerably less coking than Control Catalyst B, had an improved (i.e., greater) Olefins-to-BTX ratio when compared to Control Catalyst B, and had a BTX aromatics yield similar to Control Catalyst B. Also, as stated above in Example II, Invention Catalyst C exhibited considerably less coking than Control Catalyst B and had an improved (i.e., greater) Olefin-to-BTX ratio when compared to Control Catalyst B.

The results demonstrate that the invention catalysts, in which a non-acid-leached-zeolite-bentonite-zinc hexaborate extrudate is dried and calcined, or dried and steamed, as opposed to impregnating a non-acid-leached-zeolite-bentonite extrudate with zinc nitrate and boric acid, gives a catalyst that is significantly superior to the control catalyst.

EXAMPLE IV

This example illustrates that the Invention Catalysts described in Example I can be used to increase the concentration of benzene in the BTX fraction of the reaction product produced in the conversion of a catalytically-cracked gasoline boiling range fluid. Each test run was conducted in the same manner as described above for Example II. Results of the test runs for Invention Catalysts C and E are summarized in Table III. All test data were obtained after 8 hours on stream.

TABLE III

| Catalyst | Catalyst Preparation | Benzene Yield (wt-%) | Toluene Yield (wt-%) | Xylene Yield* (wt-%) | BTX Yield (wt-%) |
|---|---|---|---|---|---|
| C (Invention) | (EXT w/$B_6$ + STM)[a] | 10.0 | 19.1 | 13.0 | 42.1 |
| E (Invention) | (EXT w/$B_6$ + CAL)[b] | 13.6 | 20.5 | 13.7 | 47.7 |

[a]Zeolite-Bentonite-Zinc Hexaborate Extrudate Dried and Steamed (Zeolite was Not Acid-Leached).
[b]Zeolite-Bentonite-Zinc Hexaborate Extrudate Dried and Calcined (Zeolite was Not Acid-Leached).
*Xylene yield includes Ethylbenzene which is readily converted to xylene.

The test data presented in Table III clearly show that the novel methods of preparing the invention catalysts can have an impact on increasing the highest value component, benzene, of the aromatic hydrocarbons (such as, BTX, i.e., benzene, toluene, and xylene) produced in the conversion of a catalytically-cracked gasoline boiling range fluid. Invention Catalyst E, made by the novel process of calcining a zeolite-bentonite-zinc hexaborate extrudate, produced a BTX fraction of the reaction product having a higher concentration of benzene compared to Invention Catalyst C, made by the novel process of steaming, in lieu of calcining, a zeolite-bentonite-zinc hexaborate extrudate. The test data in Table III indicates that the concentration of benzene in the BTX fraction of the reaction product can be maximized by using Invention Catalyst E.

In addition, the test data in Table III indicates that the increase in BTX yield using Invention Catalyst E (calcined extrudate) (BTX yield=47.7 wt-%) as compared to Invention Catalyst C (steamed extrudate) (BTX yield=42.1 wt-%), is a result of an increase in the concetration of benzene in the BTX fraction of the reaction product. It is also significant that Invention Catalyst E increased the concentration of benzene in the BTX fraction of the reaction product without affecting the concentration of the other aromatic products (such as toluene and xylenes) in the BTX fraction of the reaction product.

EXAMPLE V

This example illustrates that Invention Catalyst F described in Example I can be used in the upgrading of coker naphtha (a thermally-cracked hydrocarbon-containing fluid in the gasoline boiling range), in a single-step process to reduce the levels of, or preferably remove, the low value olefinic and diolefinic materials (such as $C_5$+ olefins and diolefins) from such coker naphtha to produce a product containing high value petrochemicals such as aromatics (such as BTX, i.e., benzene, toluene, and xylene) and light olefins (such as ethylene and propylene). The coker naphtha sample had been produced in a commercial coker unit.

Each test run was conducted in the same manner as described above for Example II except that coker naphtha from a commercial coker unit of a refinery was used in lieu of the gasoline boiling range fluid from a catalytic cracking unit of a refinery that was used in Example II. Properties of the coker naphtha used in this example are shown in Table IV below. Results of the test run for Invention Catalyst F are summarized in Table V. All test data were obtained after 8 hours on stream.

TABLE IV

Properties of Coker Naphtha Feed

| General Properties | |
|---|---|
| Average Molecular Weight | 95.1 |
| Specific Gravity, g/cc | 0.70 |
| Nitrogen, ppm | 93.8 |
| Research Octane | 72.6 |
| Distillation, ° C. (ASTM D2887) | |
| Initial Boiling Point (IBP) (0.5 weight-% off) | 20.1 |
| 5 weight-% off | 30.0 |
| 10 weight-% off | 36.1 |
| 20 | 60.3 |
| 30 | 68.7 |
| 40 | 90.8 |
| 50 | 98.4 |
| 60 | 117.7 |
| 70 | 125.7 |
| 80 | 140.5 |
| 90 | 159.2 |
| 95 | 169.4 |
| Final Boiling Point (FBP)(99.5 weight-% off) | 296.4 |

TABLE V

Upgrading Coker Naphtha Using Invention Catalyst F

| | Coker Naphtha | Conversion Product Obtained After Upgrading Coker Naphtha Using Invention Catalyst F |
|---|---|---|
| Olefin Content, wt-% | | |
| C2 = | 0 | 5.3 |
| C3 = | 0 | 5.5 |
| C4 = | 0.1 | 2.0 |
| Benzene Content, wt-% | 0.2 | 8.7 |
| Toluene Content, wt-% | 1.2 | 22.1 |
| Xylene Content, wt-% | 2.7 | 12.2 |
| Other Materials, wt-% | | |
| C1 + C2 | 0 | 12.8 |
| C3 | 0 | 12.3 |
| C4 (includes paraffins and isoparaffins) | 0.2 | 2.9 |

TABLE V-continued

Upgrading Coker Naphtha Using Invention Catalyst F

| | Coker Naphtha | Conversion Product Obtained After Upgrading Coker Naphtha Using Invention Catalyst F |
|---|---|---|
| C5 (includes paraffins, isoparaffins, and naphthenes) | 8.7 | 0.7 |

The test data presented in Table V clearly show that the novel methods of preparation produce inventive catalysts which can be used in the upgrading of coker naphtha to produce a product containing high value petrochemicals such as aromatics (such as BTX, i.e., benzene, toluene, and xylene) and light olefins (such as ethylene and propylene). The test data also show that Invention Catalyst F upgraded the coker naphtha, which initially contained only about 4 weight percent high value petrochemicals (BTX and light olefins) before upgrade, to about 56 weight percent high value petrochemicals (BTX and light olefins) after upgrade.

The performance of the invention catalyst is certainly unexpected. One would not expect that steaming a zeolite-silica-zinc borate granulate would produce a final inventive zeolite catalyst composition that produces such a high quantity of high value petrochemicals during the use of such composition in the upgrading of coker naphtha.

EXAMPLE VI

This example illustrates that Invention Catalyst G described in Example I can be used in the upgrading of coker naphtha (a thermally-cracked hydrocarbon-containing fluid in the gasoline boiling range) to produce a product containing a high concentration of aromatics (such as BTX, i.e., benzene, toluene, and xylene). The coker naphtha sample had been produced in a commercial coker unit.

This example also illustrates that the activity (in terms of BTX yield) and stability (in terms of BTX yield over time) of Invention Catalyst G can be maintained for longer periods of time when used in the upgrading of coker naphtha when such coker naphtha is pretreated with a nitrogen removal medium such as Amberlyst 15 ion-exchange resin (provided by Rohm & Haas, Co.) or Amberlite-IR-120 ion-exchange resin (also provided by Rohm & Haas, Co.).

Three test runs were conducted. Run I was conducted in the same manner as described above for Example II except that coker naphtha from a commercial coker unit of a refinery was used in lieu of the gasoline boiling range fluid from a catalytic cracking unit of a refinery that was used in Example II. The coker naphtha used in this example was the same as the coker naphtha used in Example V above. The properties of the coker naphtha, used in this example and Example V, are shown in Table IV above.

Run II was conducted in the same manner as Run I except that the coker naphtha was passed through a stainless steel tube reactor (length: about 12 inches; inner diameter: about 0.5 inch) containing 15 grams (i.e., 20 ml) of Amberlite-IR-120 ion-exchange resin (provided by Rohm & Haas, Co.) at a flow rate of about 14 ml/hour, at a temperature of about 550° C., and at atmospheric pressure (about 0 pounds per square inch gauge) before such coker naphtha was passed through the catalyst-containing reactor. Run III was conducted in the same manner as Run II except that Amberlyst 15 ion-exchange resin (provided by Rohm & Haas, Co.) was used in lieu of the Amberlite-IR-120 ion-exchange resin.

Results of the three test runs for Invention Catalyst G are summarized in Table VI below. The test data in Table VI illustrates an on-stream 8-hour time period in 1-hour segments. Data was obtained starting with the second hour. The data in Table VI is plotted in the FIGURE.

In addition, the amount of nitrogen, in parts per million (ppm), remaining in the coker naphtha after 8 hours on stream for Runs I and III is summarized in Table VII below.

TABLE VI

BTX Yield (wt-%)

| Time[a] | Run I[b] | Run II[c] | Run III[d] |
|---|---|---|---|
| 2 | 36.1 | 32.7 | 42.2 |
| 3 | 37.6 | 42.4 | 41.5 |
| 4 | 32.2 | 40.7 | 42.2 |
| 5 | 31.1 | 41.6 | 39.8 |
| 6 | 27.4 | 39.6 | 40.8 |
| 7 | 25.7 | 38.7 | 40.6 |
| 8 | 24.2 | 37.8 | 39.9 |

[a]One-hour segments over an eight-hour on-stream time period. Data was obtained beginning at the two-hour mark.
[b]No pretreating of the coker naphtha with ion-exchange resin.
[c]Coker naphtha was pretreated with Amberlite-IR-120 ion-exchange resin (provided by Rohm & Haas Co.).
[d]Coker naphtha was pretreated with Amberlyst-15 ion-exchange resin (provided by Rohm & Haas Co.).

TABLE VII

Basic Nitrogen (ppm)

| Time[a] | Run I[b] | Run III[c] |
|---|---|---|
| 8 | 93.8 | 25.6 |

[a]Eight-hour on-stream time period.
[b]No pretreating of the coker naphtha with ion-exchange resin.
[c]Coker naphtha was pretreated with Amberlyst 15 ion-exchange resin (provided by Rohm & Haas Co.).

The data in Table VI, such data is plotted in the FIGURE, clearly demonstrates that Invention Catalyst G can be used in the upgrading of coker naphtha to produce a high octane liquid product containing a high concentration of aromatics (such as BTX, i.e., benzene, toluene, and xylene). The data in Table VI also demonstrates that the upgrading of coker naphtha (in terms of BTX yield) using Invention Catalyst G did not decline over time when such coker naphtha was pretreated with an ion-exchange resin (Runs II and III) as compared to the upgrading of coker naphtha that was not pretreated (Run I). The data demonstrates that the activity (in terms of BTX yield) and stability (in terms of BTX yield over time) of Invention Catalyst G can be maintained for longer periods of time when used in the upgrading of coker naphtha when such coker naphtha is pretreated with an ion-exchange resin such as Amberlyst 15 (provided by Rohm & Haas, Co.) or Amberlite-IR-120 (also provided by Rohm & Haas, Co.).

The data in Table VII demonstrates that more nitrogen is removed from the coker naphtha when such coker naphtha is pretreated with an ion-exchange resin such as Amberlyst 15 (provided by Rohm & Haas, Co.). The data in Table VII combined with the data in Table VI demonstrate that the pretreating of such coker naphtha with a nitrogen removal medium, such as ion-exchange resin, during the upgrading of such coker naphtha helps increase the activity and stability of Invention Catalyst G (in terms of BTX yield and BTX yield over time) (Run III), as compared to the upgrading of coker naphtha that was not pretreated (Run I), due to the removal of additional nitrogen by the ion-exchange resin.

The results shown in the above examples clearly demonstrate that the present invention is well adapted to carry out the objects and attain the ends and advantages mentioned as well as those inherent therein.

Reasonable variations, modifications, and adaptations can be made within the scope of the disclosure and the appended claims without departing from the scope of this invention.

What is claimed is:

1. A process comprising contacting, under conversion conditions, a reactions mixture consisting essentially of:
   (1) a hydrocarbon-containing fluid with
   (2) a catalyst composition made by a process consisting essentially of:
      (a) mixing a zeolite, a binder and a zinc borate compound to provide a mixture,
      (b) treating the mixture to provide formed agglomerate and
      (c) treating the formed agglomerate by a method chosen from the group consisting of calcination and steaming to provide the catalyst composition,
   thereby producing a conversion product that includes light olefins and aromatics.

2. A process according to claim 1, wherein the amount of said zeolite in the catalyst composition is in the range of from about 40 weight percent of the catalyst composition (on a total composition weight basis) to about 95 weight percent of the catalyst composition (on a total composition weight basis).

3. A process according to claim 1, wherein the amount of said binder in the catalyst composition is in the range of from about 5 weight percent of the catalyst composition (on a total composition weight basis) to about 50 weight percent of the catalyst composition (on a total composition weight basis).

4. A process according to claim 1, wherein the amount of said zinc borate compound in the catalyst composition is in the range of from about 0.5 weight percent of the catalyst composition (on a total composition weight basis) to about 30 weight percent of the catalyst composition (on a total composition weight basis).

5. A process according to claim 1, wherein the amount of said zeolite in the catalyst composition is in the range of from about 50 weight percent of the catalyst composition (on a total composition weight basis) to about 90 weight percent of the catalyst composition (on a total composition weight basis).

6. A process according to claim 1, wherein the amount of said binder in the catalyst composition is in the range of from about 8 weight percent of the catalyst composition (on a total composition weight basis) to about 40 weight percent of the catalyst composition (on a total composition weight basis).

7. A process according to claim 1, wherein the amount of said zinc borate compound in the catalyst composition is in the range of from about 1 weight percent of the catalyst composition (on a total composition weight basis) to about 25 weight percent of the catalyst composition (on a total composition weight basis).

8. A process according to claim 1, wherein said zinc borate compound has the formula $xZnO \cdot yB_2O_3$, wherein
   x=1 to 6, and
   y=1 to 5.

9. A process according to claim 1, wherein said zinc borate compound has the formula $xZnO \cdot yB_2O_3 \cdot nH_2O$, wherein
   x=1 to 6,
   y=1 to 5, and
   n=an integer ranging from 0 to 14.

10. A process according to claim 1, wherein said zinc borate compound is selected from the group consisting of zinc borate, zinc hexaborate, zinc diborate dihydrate, zinc triborate monohydrate, zinc tetraborate pentahydrate, dizinc hexaborate heptahydrate, zinc decaborate (tetrazinc dodecaborate heptahydrate), and combinations thereof.

11. A process according to claim 1, wherein said zinc borate compound is zinc hexaborate.

12. A process according to claim 1, wherein said zeolite is selected from the group consisting of ZSM-5, ZSM-8, ZSM-11, ZSM-12, ZSM-35, ZSM-38, and combinations thereof.

13. A process according to claim 1, wherein said zeolite is ZSM-5.

14. A process according to claim 1, wherein said binder is selected from the group consisting of alumina, silica, alumina-silica, aluminum phosphate, clays, calcium aluminate, bentonite, kaolin, colloidal silica, sodium silicate, titania, and combinations thereof.

15. A process according to claim 1, wherein said binder is chosen from the group consisting of bentonite and colloidal silica.

16. A process according to claim 1, wherein said mixture is an extruded mixture.

17. A process according to claim 1, wherein said mixture is a granulated mixture.

18. A process according to claim 1, wherein said mixture has been calcined.

19. A process according to claim 18, wherein said mixture is a dried, extruded mixture.

20. A process according to claim 18, wherein said mixture is a dried, granulated mixture.

21. A process according to claim 1, wherein said mixture has been steamed.

22. A process according to claim 18, wherein said mixture is a dried, extruded mixture.

23. A process according to claim 21, wherein said mixture is a dried, granulated mixture.

24. A process according to claim 1, wherein the amount of zinc in said zinc borate compound in said catalyst composition is in the range of from about 0.3 weight percent of said catalyst composition (on a total composition weight basis) to about 40 weight percent of said catalyst composition (on a total composition weight basis) and the concentration of boron in said zinc borate compound in said catalyst composition is in the range of from about 0.1 weight percent of said catalyst composition (on a total composition weight basis) to about 20 weight percent of said catalyst composition (on a total composition weight basis).

25. A process according to claim 1, wherein said hydrocarbon-containing fluid is selected from the group consisting of gasolines from catalytic oil cracking processes, pyrolysis gasolines from thermal hydrocarbon-cracking processes, naphthas, gas oils, reformates, straight-run gasoline and combinations thereof.

26. A process according to claim 1, wherein said hydrocarbon-containing fluid is a gasoline-boiling range hydrocarbon-containing fluid suitable for use as at least a gasoline blend stock generally having a boiling range of about 30° C. to about 210° C.

27. A process according to claim 1, wherein said hydrocarbon-containing fluid is a thermally-cracked hydrocarbon-containing fluid.

28. A process according to claim 1, wherein said hydrocarbon-containing fluid is coker naphtha.

29. A process according to claim 1, wherein a hydrocarbon of said hydrocarbon-containing fluid contains in the range of from about 5 carbon atoms per molecule to about 16 carbon atoms per molecule.

30. A process according to claim 1, wherein said contacting comprises passing said hydrocarbon-containing fluid through a conversion zone wherein is contained said catalyst composition.

31. A process according to claim 1, wherein said conversion conditions comprise:

- a temperature in the range of from about 400° C. to about 800° C.,
- a pressure in the range of from below atmospheric pressure upwardly to about 500 pounds per square inch absolute (psia), and
- a contacting charge rate of said hydrocarbon-containing fluid such that the contacting weight hourly space velocity is in the range of from exceeding 0 hour$^{-1}$ upwardly to about 1000 hour$^{-1}$.

32. A process according to claim 1, further comprising passing said hydrocarbon-containing fluid through a pretreatment zone wherein is contained a nitrogen removal medium. before said hydrocarbon-containing fluid is subjected to said contacting, under said conversion conditions, with said catalyst composition.

33. A process according to claim 30, wherein said nitrogen removal medium is an ion-exchange resin.

34. A process according to claim 33, wherein said pretreating conditions comprise:

- a temperature in the range of from about 0° C. to about 550° C.,
- a pressure in the range of from below atmospheric pressure upwardly to about 500 pounds per square inch absolute (psia), and
- a pretreating charge rate of said hydrocarbon-containing fluid such that the pretreating weight hourly space velocity is in the range of from exceeding 0 hour$^{-1}$ upwardly to about 1000 hour$^{-1}$.

* * * * *